United States Patent [19]

Nerone

[11] Patent Number: 5,406,177
[45] Date of Patent: Apr. 11, 1995

[54] GAS DISCHARGE LAMP BALLAST CIRCUIT WITH COMPACT STARTING CIRCUIT

[75] Inventor: Louis R. Nerone, Brecksville, Ohio
[73] Assignee: General Electric Company, Schenectady, N.Y.
[21] Appl. No.: 228,850
[22] Filed: Apr. 18, 1994
[51] Int. Cl.[6] .............................................. G05F 1/00
[52] U.S. Cl. .................................. 315/307; 315/291; 315/209 R; 315/355; 315/358; 315/DIG. 7; 315/DIG. 5
[58] Field of Search ................... 315/209 R, 291, 307, 315/308, DIG. 5, DIG. 7, 355, 238

[56] References Cited

U.S. PATENT DOCUMENTS 4,603,378  7/1986  Virta ................................ 315/209 R
5,004,960  4/1991  Cockram et al. ...................... 315/307
5,345,148  9/1994  Zeng et al. ........................ 315/209 R Primary Examiner—Robert J. Pascal
Assistant Examiner—Reginald A. Ratliff
Attorney, Agent, or Firm—George E. Hawranko; Stanley C. Corwin

[57] ABSTRACT

In accordance with the invention, there is provided a ballast circuit for a gas discharge lamp. The circuit comprises means for providing a d.c. bus voltage on a bus conductor with respect to ground. The circuit includes a resonant load circuit incorporating a gas discharge lamp and including first and second resonant impedances whose values determine the operating frequency of the resonant load circuit. Further included is a converter circuit coupled to the resonant load circuit so as to impress a bidirectional voltage thereacross and thereby induce a bidirectional current in the resonant load circuit. The converter comprises first and second switches serially connected between the bus conductor and ground, and having a common node coupled to a first end of the resonant load circuit and through which the bidirectional load current flows. A current-sensing winding senses at least a portion of the current flowing in the resonant load circuit. A feedback arrangement generates a feedback signal in response to current flowing in the current-sensing winding, and regeneratively controls the first and second switches in response to the feedback signal. A starting circuit superimposes a starting current pulse through the current-sensing winding, so as to achieve the regenerative control of the first and second switches.

13 Claims, 3 Drawing Sheets

GAS DISCHARGE LAMP BALLAST CIRCUIT WITH COMPACT STARTING CIRCUIT

FIELD OF THE INVENTION

The present invention relates to a ballast, or power supply, circuit for a gas discharge lamp, and more particularly, to such a ballast circuit that incorporates a compact starting circuit.

BACKGROUND OF THE INVENTION

A gas discharge (e.g. fluorescent) lamp typically utilizes a ballast circuit to convert an a.c. line voltage to a high frequency bidirectional voltage, which is then impressed across a resonant load circuit containing the gas discharge lamp. The resonant load circuit includes a resonant inductor and a resonant capacitor for setting the frequency of resonance of current in such circuit. The ballast circuit includes a converter, of the series half-bridge type, for instance, that includes a pair of switches for alternately connecting one end of the resonant load circuit to a d.c. bus voltage and then to ground; in this way, the mentioned bidirectional voltage is impressed across the resonant load circuit.

A ballast circuit of the foregoing type is disclosed in co-pending U.S. patent application Ser. No. 08/020,275, filed Feb. 18, 1993, allowed Sep. 24, 1993, entitled "Electronic Ballast Arrangement for a Compact Fluorescent Lamp," by Louis R. Nerone, the present inventor; such application is assigned to the present assignee, and its disclosure is incorporated herein by reference. The disclosed power supply circuit utilizes feedback circuitry for controlling the mentioned pair of switches of the converter. A signal representing a current in the resonant load circuit is fed back to a pair of gate-control circuits for controlling the switching state of the mentioned pair of converter switches; each gate-control circuit has a transformer winding coupled to receive the foregoing feedback signal. During steady state operation, the gate-control circuits operate in a regenerative, or self-resonant, manner. To initiate the alternate switching of the converter's switches, an additional winding is coupled to a transformer winding of one of the gate-control circuits. A pulse of current is generated on the additional winding so as to be impressed across the gates of the converter switches, to initiate start-up of a regenerative mode of operation of the converter switches.

While being effective for starting the ballast circuitry, it would be desirable to avoid the cost of the additional winding, and, where ballast size is limited, to avoid the added bulk required to incorporate the additional winding.

OBJECTS AND SUMMARY OF THE INVENTION

It is, accordingly, an object of the present invention to provide a ballast circuit for a gas discharge lamp of the type which utilizes a regenerative feedback circuit for controlling switches of the ballast circuit, and which incorporates a starting circuit that does not require an additional transformer winding.

A further object of the invention is to provide a ballast circuit of the foregoing type whose starting circuit can be economically made with readily available electrical components.

In accordance with the invention, there is provided a ballast circuit for a gas discharge lamp. The circuit includes means for providing a d.c. bus voltage on a bus conductor with respect to ground. It further includes a resonant load circuit incorporating a gas discharge lamp and including first and second resonant impedances whose values determine the operating frequency of the resonant load circuit. Further included is a converter circuit coupled to the resonant load circuit so as to impress a bidirectional voltage thereacross and thereby induce a bidirectional current in the resonant load circuit. The converter comprises first and second switches serially connected between the bus conductor and ground, and having a common node coupled to a first end of the resonant load circuit and through which the bidirectional load current flows. A current-sensing winding senses at least a portion of the current flowing in the resonant load circuit. A feedback arrangement generates a feedback signal in response to current flowing in the current-sensing winding, and regeneratively controls the first and second switches in response to the feedback signal. A starting circuit superimposes a starting current pulse through the current-sensing winding, so as to achieve the regenerative control of the first and second switches.

BRIEF DESCRIPTION OF THE DRAWING FIGURES

The foregoing, and further, objects and advantages of the invention will become apparent from the following description when read in conjunction with the drawing, in which.

DESCRIPTION OF THE PREFERRED EMBODIMENTS

Figure 1:
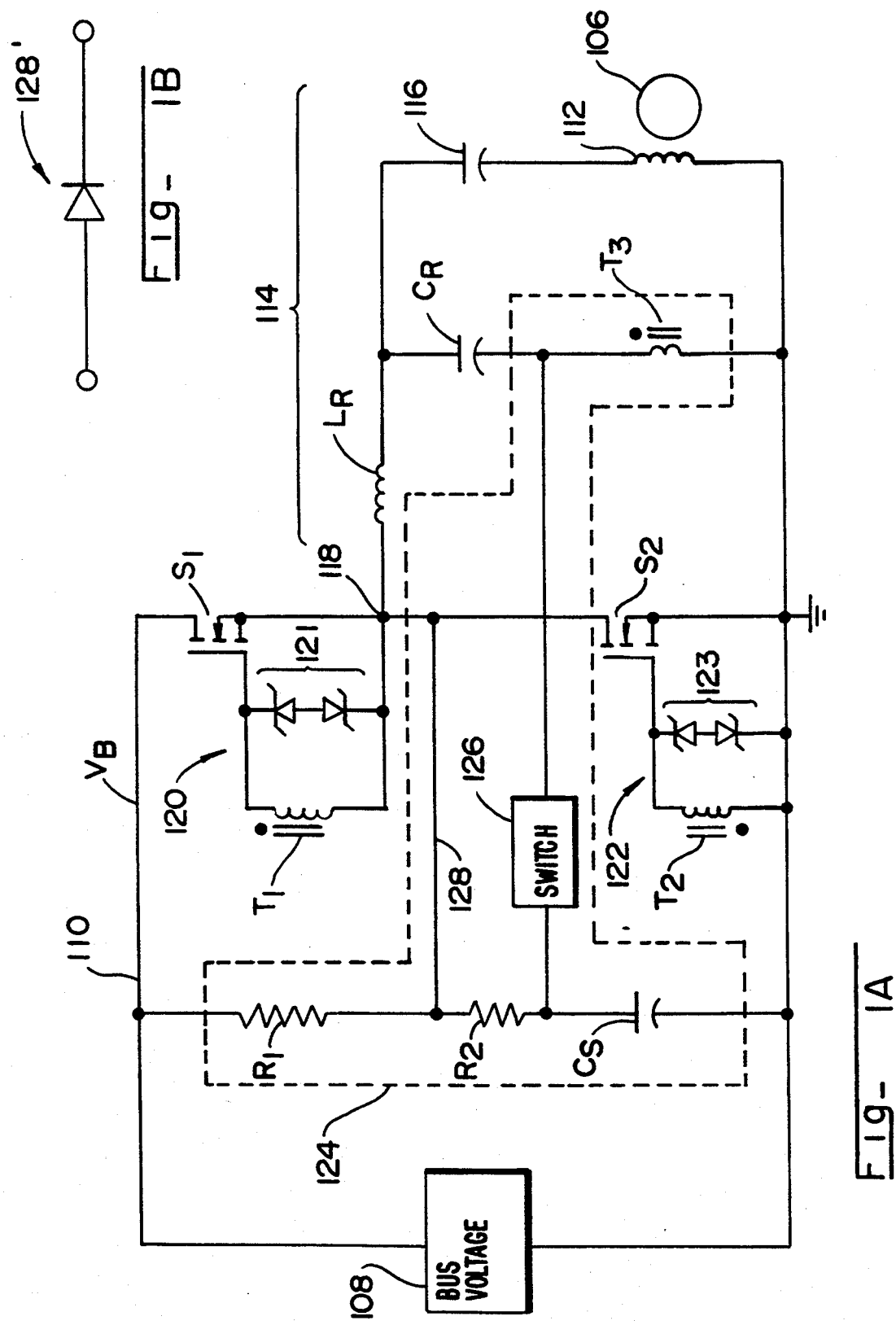
FIG. 1A is a schematic diagram, partially in block form, of a ballast circuit for a gas discharge lamp that incorporates a starting circuit in accordance with the invention.
FIG. 1B is a schematic diagram of an alternative form of a circuit for deactivating the starting circuit of FIG. 1A.

FIG. 1A is a schematic diagram of a ballast circuit for powering a gas discharge lamp 106, which may comprise a low pressure (e.g. fluorescent), electrodeless lamp. A source 108 of d.c. bus voltage provides on a bus conductor 110 a bus voltage $V_B$ for powering lamp 106. Source 108 typically receives a.c. voltage and rectifies such voltage to produce d.c. bus voltage $V_B$, such as with a full-wave bridge rectifier (not shown). Source 108 of d.c. bus voltage typically includes a power factor correction circuit (not shown).

As shown, lamp 106 comprises an electrodeless lamp that cooperates with a winding 112; winding 112 acts as a primary winding of a transformer coupling, with a plasma (not shown) in lamp 106 acting as a secondary winding. Winding 112 is contained in a resonant load circuit 114, i.e. the circuit that is bracketed on the right side of FIG. 1A. Resonant load circuit 114 includes a resonant inductor $L_R$ and a resonant capacitor $C_R$, whose values determine the frequency of current in the resonant load circuit. A capacitor 116 serves to block d.c. current from flowing through winding 112.

A bidirectional current is generated in resonant load circuit 114 through an alternating sequence of connecting node 118 to bus conductor 110 to receive bus voltage $V_B$, and then to ground. This is carried out through the alternate switching action of a pair of serially coupled switches $S_1$ and $S_2$, which are connected between bus conductor 110 and ground, and whose common node comprises node 118. Switches $S_1$ and $S_2$, which may comprise n-channel MOSFETs, for instance, are controlled by respective gate, or control terminal, circuits 120 and 122. Gate circuits 120 and 122 respectively employ transformer windings $T_1$, and $T_2$ that are poled oppositely to each other as shown by the respective dots in the proximity of the windings. Each circuit 120 and 122 has a respective back-to-back coupled pair of Zener diodes shunted across its associated transformer winding $T_1$ or $T_2$. The upper diode of each pair is typically rated at 7.5 volts, and the lower diode of each pair is typically rated at 10 volts. The Zener diode pairs 121 and 123 limit the voltage excursions across the gates of their associated switches $S_1$ and $S_2$ to below about 8 volts, thereby preventing overvoltage failure of the gates.

Transformer windings $T_1$ and $T_2$ are each coupled to transformer winding $T_3$. Winding $T_3$, in turn, is serially coupled to resonant capacitor $C_R$, for instance, so as to normally provide a representation of current flowing through part of resonant load circuit 114.

In brief, a signal representing the resonant load current sensed in transformer winding $T_3$ is fed back to gate circuits 120 and 122 to control the switching action of switches $S_1$ and $S_2$. Because transformer windings $T_1$ and $T_2$ are oppositely poled, alternate switching action of switches $S_1$ and $S_2$ occurs; that is, when switch $S_1$ is turned on by gate circuit 120, switch $S_2$ is turned off by gate circuit 122, and vice-versa. During steady state operation, the signal fed back from transformer winding $T_3$ to gate circuit windings $T_1$ and $T_2$ controls switches $S_1$ and $S_2$ in a regenerative fashion, whereby a self-sustaining control of switches $S_1$ and $S_2$ is achieved. Further details of such a regenerative feedback approach for controlling switches $S_2$ and $S_2$ may be found, for example, in the above-referenced patent application by Louis R. Nerone.

Before regenerative feedback control of switches $S_1$ and $S_2$ is achieved, however, it is necessary to provide circuitry for initiating operation of the switches. Thus, a starting circuit 124, shown within a dashed-line configuration, is provided in accordance with the invention. The starting circuit 124 includes a starting capacitor $C_s$ that is charged to a starting voltage via serially connected resistors $R_1$ and $R_2$, which are, in turn, connected to bus conductor 110. Meanwhile, a momentary-on switch 126 is coupled between starting capacitor $C_s$ and transformer winding $T_3$. Winding $T_3$ typically has less than about 1 volt across it, due to a typical 1:11 turns ratio with gate circuit windings $T_1$ and $T_2$ and a limitation of voltage across windings $T_1$ and $T_2$, due to Zener diode pairs 121 and 123, of about 8 volts. Momentary-on switch 126 is of the voltage-breakover type, and may comprise, for instance, a diac having a breakover voltage of 34 volts. When starting capacitor $C_s$ charges up to the starting voltage, i.e., a voltage at which momentary-on switch 126 breaks over (i.e. turns on), starting capacitor $C_s$ rapidly discharges through transformer winding $T_3$ via switch 126. A start-up pulse of current is thereby superimposed through transformer winding $T_3$, i.e. it is in addition to any current in resonant capacitor $C_R$ that flows through winding $T_3$.

The start-up pulse in transformer winding $T_3$ initiates operation of gate circuits 120 and 122 to achieve regenerative feedback control of switches $S_1$ and $S_2$, with switch $S_1$ being turned on prior to switch $S_2$. Further start-up pulses, however, should be suppressed, so as not to interfere with the regenerative gate control. Thus, the voltage on switching capacitor $C_s$ should be maintained below the starting, or breakover, voltage of switch 126. This is preferably accomplished by shorting the common node of serially coupled resistors $R_1$ and $R_2$ to common node 118 with a shorting connection 128. As mentioned above, the voltage at common node 118 is alternately at bus voltage $V_B$ and then at ground, and so on. This occurs at a typical frequency of 2.5 megahertz during steady state lamp operation. The value of resistor $R_2$, which receives such alternating voltages, is thus chosen to maintain the voltage on starting capacitor $C_s$ below the starting voltage.

If switch 128 has a low breakover voltage of 34 volts, for instance, a p-n diode 128', shown in FIG. 1A, could be used instead of shorting path 128 to deactivate starting circuit 124. P-n diode 128' prevents bus voltage $V_B$ that is periodically on node 118 from being impressed across starting capacitor $C_s$, while providing a path to the potential of ground that is periodically on node 118. Being a bipolar device, p-n diode is considerably slower in operation than unipolar MOSFET switches $S_1$ and $S_2$, necessitating a reduction in frequency of operation of switches $S_1$ and $S_2$; e.g., considerably below 2.5 megahertz.

Beneficially, the breakover voltage of switch 126 can be chosen to prevent generation of a start-up pulse if bus voltage $V_B$ is in a "brown-out" region, which occurs if the voltage on the power supply lines (not shown) falls below a predetermined level. This is especially important where lamp 106 is an electrodeless lamp, because such lamp requires close to rated voltage to start. If sufficient voltage is not present to start electrodeless lamp 106, a start-up pulse that initiates regenerative operation of switches $S_1$ and $S_2$ would cause these switches to dissipate an unusually large amount of power, risking burn-out of the switches within typically about 0.5 to 1 second. Brown-out protection is achieved by selecting switch 126 to have a breakover voltage sufficiently high that it switches on only when bus voltage $V_B$ is adequate to start electrodeless lamp 106.

Figure 2:
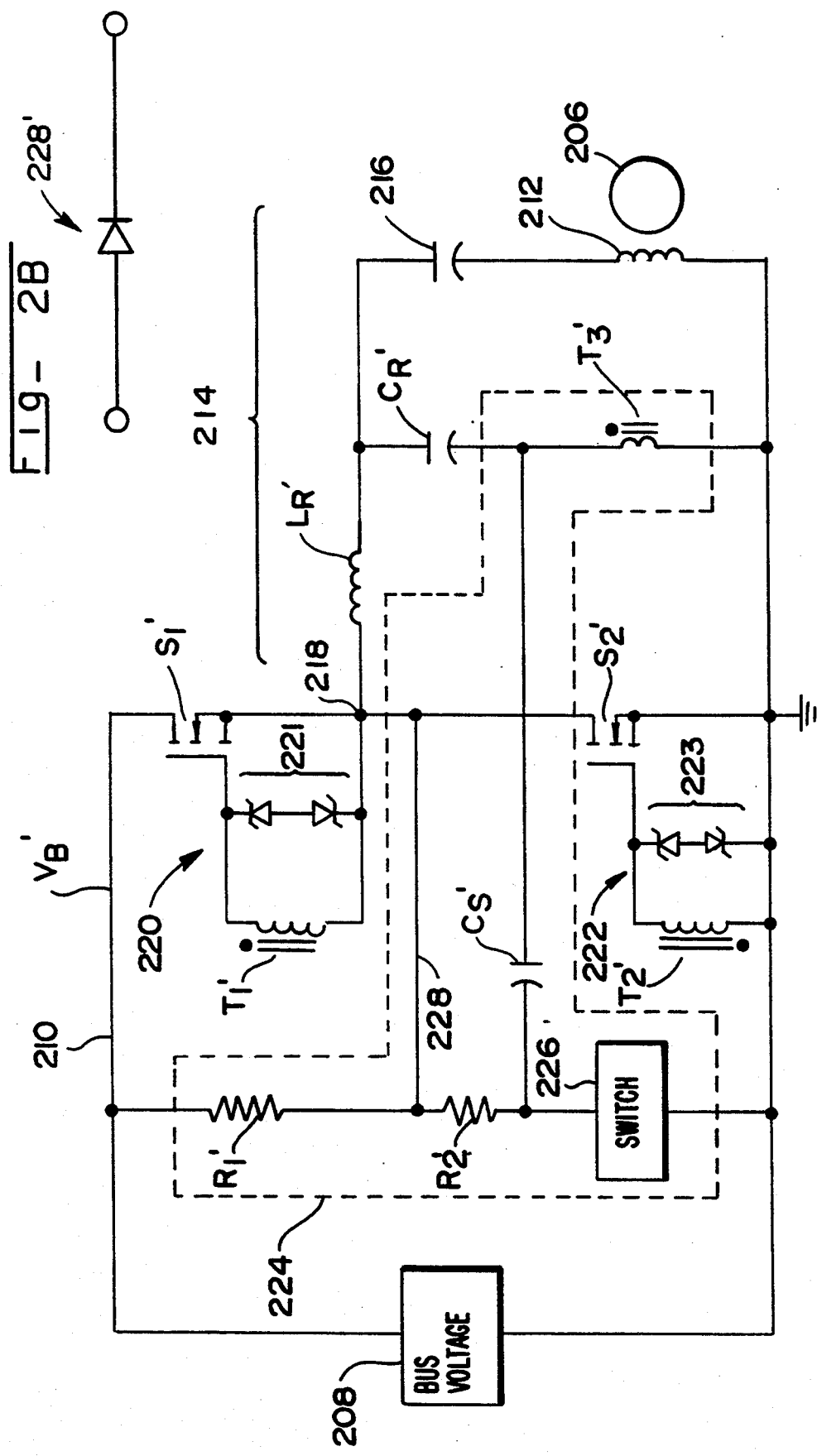
FIG. 2A is a schematic diagram, partially in block form, of a ballast circuit for a gas discharge lamp that incorporates a starting circuit in accordance with a further embodiment of the invention.
FIG. 2B is a schematic diagram of an alternative form of a circuit for deactivating the starting circuit of FIG. 2A.

In the circuit of FIG. 1A, starting circuit 124 causes switch $S_1$ to turn on before switch $S_2$. FIG. 2A shows an arrangement of a starting circuit 224 for turning on switch $S_2'$ first. Like parts as between FIGS. 1 and 2 are indicated by the use of like reference numerals, with the first digit of each reference numeral referring to its associated drawing number. Thus, except for the changes noted below, starting circuit 224 is essentially like starting circuit 124 of FIG. 1A. In starting circuit 224, starting capacitor $C_s'$ is coupled between transformer winding $T_3'$ and resistors $R_3'$ and $R_2'$. Momentary-on switch 226 is coupled essentially in parallel with the starting capacitor, considering that the voltage drop across winding $T_3'$ is usually quite small (e.g., below about 1 volt).

When starting capacitor $C_s'$ is charged up to the starting voltage at which switch 226 breaks over, it discharges to ground through switch 226, creating a starting current pulse in winding $T_3'$. However, because starting capacitor $C_s'$ is oppositely poled in comparison to starting capacitor $C_s$ of FIG. 1A, the start-up pulse in FIG. 2A causes converter switch $S_2'$ to turn on first. Once regenerative control of switches $S_1'$ and $S_2'$ is achieved, shorting path 228 is used the same fashion as shorting path 128 in FIG. 1A to deactivate starting circuit 224. Alternatively, if switch 228 has a low breakover voltage of 34 volts, for instance, a p-n diode 228', shown in FIG. 2A, could be used instead of shorting path 228 to deactivate starting circuit 224.

As with the circuit of FIG. 1A, brown-out protection can be achieved for an electrodeless lamp 206 by selecting the breakover voltage of switch 226 to be sufficiently high that a starting pulse is generated only when bus voltage $V_B'$ is adequate to start such electrodeless lamp.

With reference to FIGS. 1 and 2, optimal initial conditions on the starting capacitors to initiate regenerative operation of the converter switches depends on the selection of the breakover voltage for the momentary-on switches 126 and 226. For example, if a sidac is used with a breakover voltage of 240 volts, FIG. 2A is preferred because it will cause switch $S_2'$ to turn on first with the highest value of initial current in resonant inductor $L_R'$. If, instead, a diac is used with a breakover voltage of only 34 volts, for instance, FIG. 1A is preferred because it will result in the highest initial current through resonant inductor $L_R$.

Figure 3:
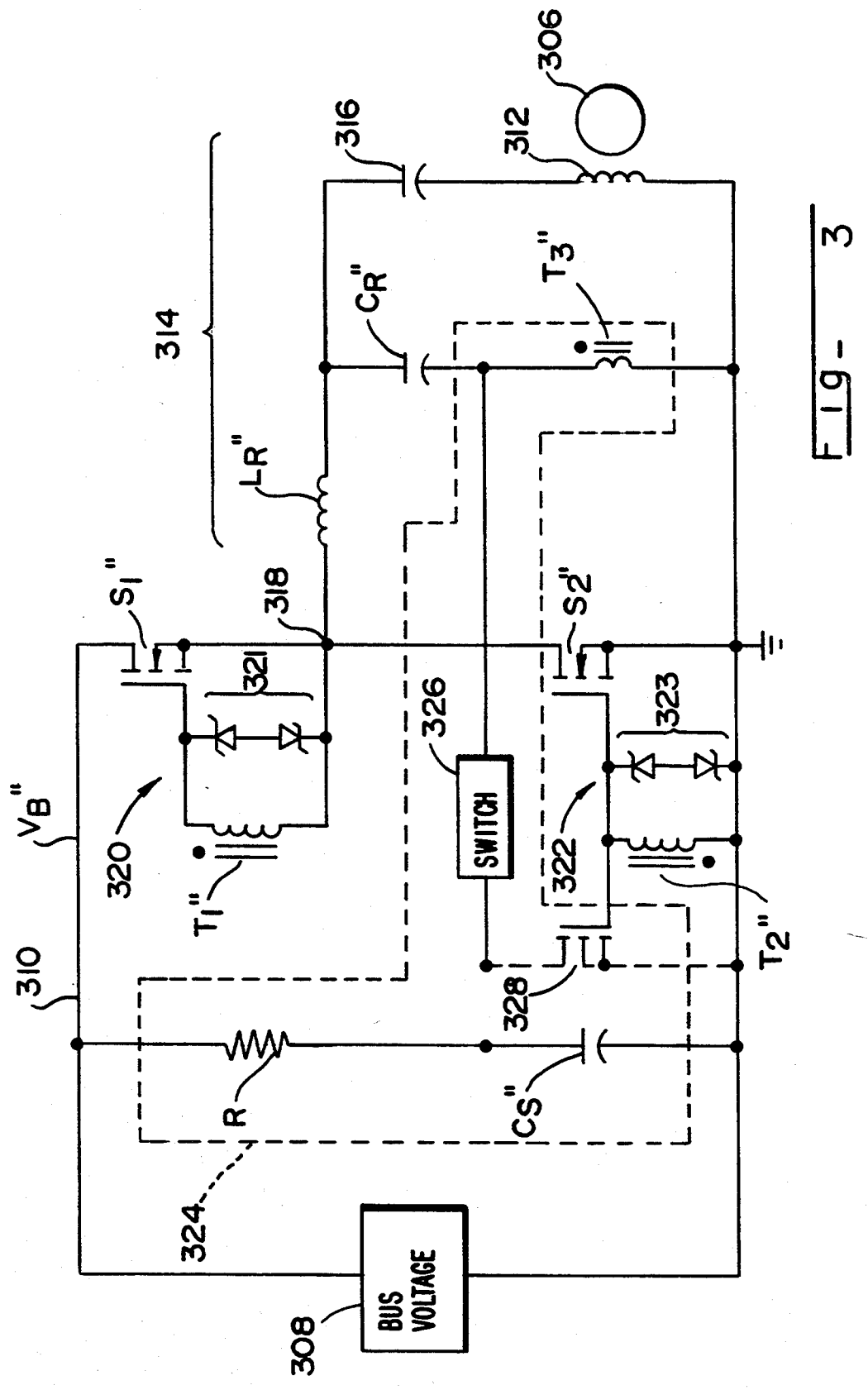
FIG. 3 is a schematic diagram, partially in block form, of a ballast circuit for a gas discharge lamp that incorporates a starting circuit in accordance with a still further embodiment of the invention.

FIG. 3 shows a further ballast circuit employing a starting circuit 324 that incorporates a switch 326 with a relatively low breakover voltage. For instance, switch 326 may comprise a diac with a breakover voltage of 34 volts, and which is biased to operate in a momentary-on, i.e. non-latching manner. To deactivate starting circuit 324, a switch 328 (shown in dashed lines), such as an n-channel MOSFET 328 can be used, with the gates of switch 328 and of switch and $S_2''$ interconnected. Accordingly, starting capacitor $C_s''$ is discharged whenever converter switch $S_2''$ is on, which occurs with a typical frequency of 2.5 megahertz. In the off period of switch 328, a relatively high impedance value in resistor R prevents the starting capacitor from reaching a starting voltage at which switch 326 would break over.

If switch 326 is operated as a latching device, deactivation switch 328 is unnecessary. For instance, switch 326 may comprise a silicon triggered switch (STS) whose current is set above the holding current of the device after a starting pulse has been generated.

If the FIG. 3 circuit uses a switch 326 with a breakover voltage much smaller than bus voltage $V_B''$, it would lack the brown-out protection for an electrodeless lamp, described above.

With regard to the circuit of FIG. 1A incorporating a 23-watt electrodeless lamp 106 with a rated bus voltage $V_B$ of 300 volts, with switch 126 comprising a sidac, Motorola part No. MKP9V240, with a breakover voltage of 240 volts, and with bidirectional voltage in resonant load circuit 114 having a frequency of 2.5 megahertz, exemplary circuit values are as follows: resonant inductor $L_R$, 35 microhenries; resonant capacitor $C_R$ 560 picofarads; capacitor 116, 1.5 nanofarads; inductor 112, 10 microhenries; transformer windings $T_1$ and $T_2$, 2 microhenries each; transformer winding $T_3$, 17 nanohenries; the turns ratio between winding $T_3$ and windings $T_1$ and $T_2$, 1:11; resistor $R_1$, 270 K ohms; resistor $R_2$, 130 K ohms; starting capacitor $C_s$, 6.8 nanofarads; and Zener diode pairs 121 and 123, the above-shown diode, 7.5 volts and the lower-shown diode, 10 volts.

With regard to the circuit of FIG. 2A incorporating a 23-watt electrodeless lamp 206 with a rated bus voltage $V_B'$ of 300 volts, with switch 226 comprising a sidac, Motorola part No. MKP9V240, with a breakover voltage of 240 volts, and with bidirectional voltage in resonant load circuit 214 having a frequency of 2.5 megahertz, exemplary circuit values are as follows: resonant inductor $L_R''$, 35 microhenries; resonant capacitor 560 picofarads; capacitor 216, 1.5 nanofarads; inductor 212, 10 microhenries; transformer windings $T_1'$ and $T_2'$, 2 microhenries each; transformer winding $T_3'$ 17 nanohenries; the turns ratio between winding $T_3'$ and windings $T_1'$, 1:11; resistor $R_1$, 270 K ohms; resistor $R_2'$ 130 K ohms; starting capacitor $C_s'$ 6.8 nanofarads; and Zener diode pairs 221 and 223, the above-shown diode, 7.5 volts and the lower-shown diode, 10 volts.

With regard to the circuit of FIG. 3 incorporating a 23-watt electrodeless lamp 306 with a rated bus voltage $V_B''$ of 300 volts and with switch 326 comprising a diac sold by Philips Semiconductors of Eindhoven, Netherlands, with a 34-volt breakover voltage, part No. BR100/03, and with bidirectional voltage in resonant load circuit 314 having a frequency of 2.5 megahertz, exemplary circuit values are as follows: resonant inductor $L_R''$ 35 microhenries; resonant capacitor $C_R''$ 560 picofarads; capacitor 316, 1.5 nanofarads; inductor 312, 10 microhenries; transformer windings $T_1''$ and $T_2''$ 2 microhenries each; transformer winding $T_3''$ 17 nanohenries; the turns ratio between winding $T_3''$ and windings $T_1''$ and $T_2''$ 1:11; resistor R, 400 K ohms; starting capacitor $C_s''$ 10 nanofarads; and Zener diode pairs 321 and 323, the above-shown diode, 7.5 volts and the lower-shown diode, 10 volts.

From the foregoing, it will be appreciated that the invention provides a ballast circuit for a gas discharge lamp of the type which utilizes a regenerative feedback circuit for controlling switches of the ballast circuit, and which incorporates a starting circuit that does not require an additional transformer winding. The ballast circuit, further, can employ starting circuitry that can be economically made with readily available electrical components.

While the invention has been described with respect to specific embodiments by way of illustration, many modifications and changes will occur to those skilled in the art. For instance, the electrodeless gas discharge lamps shown herein may be replaced with electroded-type lamps. It is, therefore, to be understood that the appended claims are intended to cover all such modifications and changes as fall within the true scope and spirit of the invention.

What is claimed is:

1. A ballast circuit for a gas discharge lamp, comprising:
    (a) means for providing a d.c. bus voltage on a bus conductor with respect to ground;
    (b) a resonant load circuit incorporating a gas discharge lamp and including first and second resonant impedances whose values determine the operating frequency of said resonant load circuit;
    (c) a converter circuit coupled to said resonant load circuit so as to impress a bidirectional voltage thereacross and thereby induce a bidirectional current in said resonant load circuit; said converter comprising first and second switches serially connected between said bus conductor and ground, and having a common node coupled to a first end of said resonant load circuit and through which said bidirectional load current flows;
(d) a current-sensing winding for sensing at least a portion of the current flowing in said resonant load circuit;
(e) a feedback arrangement for generating a feedback signal in response to current flowing in said current-sensing winding, and for regeneratively controlling said first and second switches in response to said feedback signal; and
(f) a starting circuit for superimposing a starting current pulse through said current-sensing winding, so as to achieve said regenerative control of said first and second switches.

2. The ballast circuit of claim 1, where said current-sensing winding is substantially at the potential of ground relative to said starting voltage.

3. A ballast circuit for a gas discharge lamp, comprising:
(a) means for providing a d.c. bus voltage on a bus conductor with respect to ground;
(b) a resonant load circuit incorporating a gas discharge lamp and including first and second resonant impedances whose values determine the operating frequency of said resonant load circuit;
(c) a converter circuit coupled to said resonant load circuit so as to impress a bidirectional voltage thereacross and thereby induce a bidirectional current in said resonant load circuit; said converter comprising first and second switches serially connected between said bus conductor and ground, and having a common node coupled to a first end of said resonant load circuit and through which said bidirectional load current flows;
(d) a current-sensing winding for sensing at least a portion of the current flowing in said resonant load circuit;
(e) a feedback arrangement for generating a feedback signal in response to current flowing in said current-sensing winding, and for regeneratively controlling said first and second switches in response to said feedback signal; and
(f) a starting circuit for superimposing a starting current pulse through said current-sensing winding, so as to achieve said regenerative control of said first and second switches, said starting circuit comprising:
(i) a starting capacitor connected, via a resistance, between said bus conductor and ground so that said capacitor charges up to a starting voltage; and
(ii) a voltage-breakover switch coupled between said capacitor and a terminal of said current-sensing winding so as to switch on when the voltage on said capacitor reaches said starting voltage.

4. The ballast circuit of claim 3, where said current-sensing winding is substantially at the potential of ground relative to said starting voltage.

5. The ballast circuit of claim 3, wherein said voltage-breakover switch is biased to operate in a latching manner, whereby said starting circuit is automatically deactivated when said regenerative control of said first and second switches has been achieved.

6. The ballast circuit of claim 3, wherein said voltage-breakover switch is biased to operate in a non-latching, momentary-on manner.

7. The ballast circuit of claim 6, in combination with an electrodeless, low pressure discharge lamp, and wherein the breakover voltage of said voltage-breakover switch is sufficiently high to prevent said starting capacitor from charging up to said starting voltage if the d.c. bus voltage is below an adequate value for said lamp to start.

8. The ballast circuit of claim 6, wherein said starting circuit further comprises a deactivation circuit for maintaining the voltage of said starting capacitor below said starting voltage after said regenerative control of said first and second switches has been achieved; said deactivation circuit comprising a short circuit between (i) a common node of a pair of serially connected resistors that implement said resistance of said starting circuit, and (ii) said common node of said converter circuit.

9. The ballast circuit of claim 8, wherein said starting circuit further comprises a deactivation circuit for maintaining the voltage of said starting capacitor below said starting voltage after said regenerative control of said first and second switches has been achieved; said deactivation circuit comprising a switch coupled across said starting capacitor and having a gate coupled to a gate of the converter switch that is connected to ground, whereby said starting capacitor is discharged whenever the foregoing converter switch is on.

10. A ballast circuit for a gas discharge lamp, comprising:
(a) means for providing a d.c. bus voltage on a bus conductor with respect to ground;
(b) a resonant load circuit incorporating a gas discharge lamp and including first and second resonant impedances whose values determine the operating frequency of said resonant load circuit;
(c) a converter circuit coupled to said resonant load circuit so as to impress a bidirectional voltage thereacross and thereby induce a bidirectional current in said resonant load circuit; said converter comprising first and second switches serially connected between said bus conductor and ground, and having a common node coupled to a first end of said resonant load circuit and through which said bidirectional load current flows;
(d) a current-sensing winding for sensing at least a portion of the current flowing in said resonant load circuit;
(e) a feedback arrangement for generating a feedback signal in response to current flowing in said current-sensing winding, and for regeneratively controlling said first and second switches in response to said feedback signal; and
(f) a starting circuit for superimposing a starting current pulse through said current-sensing winding, so as to achieve said regenerative control of said first and second switches, said starting circuit comprising:
(i) a starting capacitor connected, via a resistance, between said bus conductor and a terminal of said current-sensing winding so that said capacitor charges up to a starting voltage; and
(ii) a momentary-on, voltage-breakover switch coupled between said capacitor and ground so as to momentarily switch on when the voltage on said capacitor reaches said starting voltage.

11. The ballast circuit of claim 10, where said current-sensing winding is substantially at the potential of ground relative to said starting voltage.

12. The ballast circuit of claim 10, in combination with an electrodeless, low pressure discharge lamp, and wherein the breakover voltage of said voltage-breakover switch is sufficiently high to prevent said starting capacitor from charging up to said starting voltage if the d.c. bus voltage is below an adequate value for said lamp to start.

13. The ballast circuit of claim 10, wherein said starting circuit further comprises a deactivation circuit for maintaining the voltage of said starting capacitor below said starting voltage after said regenerative control of said first and second switches has been achieved; said deactivation circuit comprising a short circuit between (i) a common node of a pair of serially connected resistors that implement said resistance of said starting circuit, and (ii) said common node of said converter circuit.

* * * * *